United States Patent
Vaughn

(10) Patent No.: US 9,715,073 B1
(45) Date of Patent: Jul. 25, 2017

(54) OPTICAL TRUNK CABLE HAVING WEB-CONNECTED SUB-UNITIZED CONFIGURATION

(71) Applicant: AFL Telecommunications LLC, Duncan, SC (US)

(72) Inventor: Roger Vaughn, Greer, SC (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

(21) Appl. No.: 15/047,151

(22) Filed: Feb. 18, 2016

Related U.S. Application Data

(60) Provisional application No. 62/118,229, filed on Feb. 19, 2015.

(51) Int. Cl.
G02B 6/44 (2006.01)
H01B 11/22 (2006.01)

(52) U.S. Cl.
CPC .......... *G02B 6/4434* (2013.01); *G02B 6/441* (2013.01); *G02B 6/4433* (2013.01); *H01B 11/22* (2013.01)

(58) Field of Classification Search
None
See application file for complete search history.

(56) References Cited

U.S. PATENT DOCUMENTS

| | | | | |
|---|---|---|---|---|
| 4,952,020 A * | 8/1990 | Huber | ........... | G02B 6/4403 174/117 R |
| 5,039,195 A * | 8/1991 | Jenkins | ........... | G02B 6/4416 174/70 R |
| 5,188,883 A * | 2/1993 | Rawlyk | ........... | B29C 47/0021 174/107 |
| 5,569,050 A * | 10/1996 | Lloyd | ........... | B29C 65/08 439/465 |
| 5,602,953 A * | 2/1997 | Delage | ........... | G02B 6/4403 174/27 |
| 5,636,308 A * | 6/1997 | Personne | ........... | G02B 6/4434 385/102 |
| 6,188,821 B1 * | 2/2001 | McAlpine | ........... | G02B 6/4484 385/100 |
| 6,249,628 B1 * | 6/2001 | Rutterman | ........... | G02B 6/4495 385/100 |
| 6,295,401 B1 * | 9/2001 | Rutterman | ........... | G02B 6/4495 385/109 |
| 6,356,690 B1 * | 3/2002 | McAlpine | ........... | G02B 6/4422 385/100 |
| 6,363,192 B1 * | 3/2002 | Spooner | ........... | G02B 6/4416 174/115 |
| 6,529,663 B1 * | 3/2003 | Parris | ........... | G02B 6/4429 385/113 |
| 6,546,175 B1 * | 4/2003 | Wagman | ........... | G02B 6/4429 385/113 |
| 6,563,990 B1 * | 5/2003 | Hurley | ........... | G02B 6/4422 385/101 |

(Continued)

FOREIGN PATENT DOCUMENTS

| GB | 2527580 A * | 6/2014 | ............. H01B 11/22 |
|---|---|---|---|
| WO | WO-2015/198017 A1 * | 6/2015 | ............. G02B 6/44 |

*Primary Examiner* — Jerry Rahll
(74) *Attorney, Agent, or Firm* — Dority & Manning, P.A.

(57) ABSTRACT

An optical trunk cable includes at least one elongated strength member. The optical trunk cable further includes a plurality of elongated optical fiber units, each of the optical fiber units having an inner jacket containing a plurality of optical fibers.

16 Claims, 2 Drawing Sheets

(56) References Cited

U.S. PATENT DOCUMENTS

| | | | | |
|---|---|---|---|---|
| 6,734,364 B2* | 5/2004 | Price | | H01B 7/0853 174/113 C |
| 6,813,422 B1* | 11/2004 | Krishnamurthy | | G02B 6/4411 385/109 |
| 6,823,120 B2* | 11/2004 | Hurley | | G02B 6/4482 385/112 |
| 6,928,217 B2* | 8/2005 | Mohler | | G02B 6/4422 385/113 |
| 7,391,943 B2* | 6/2008 | Blazer | | G02B 6/4433 385/100 |
| 7,454,107 B2* | 11/2008 | Miller | | G02B 6/4433 385/100 |
| 7,558,454 B2* | 7/2009 | Keller | | G02B 6/4432 385/113 |
| 8,538,216 B2* | 9/2013 | Abernathy | | G02B 6/4402 385/100 |
| 8,768,127 B1* | 7/2014 | Burnett | | G02B 6/441 385/110 |
| 8,818,156 B2* | 8/2014 | Nave | | G02B 6/4459 385/134 |
| 9,091,830 B2* | 7/2015 | Blazer | | G02B 6/4413 |
| 9,136,045 B2* | 9/2015 | Burke | | H01B 11/22 |
| 9,239,441 B2* | 1/2016 | Melton | | G02B 6/3887 |
| 9,316,801 B1* | 4/2016 | Kithuka | | G02B 6/4495 |
| 2002/0125036 A1* | 9/2002 | Price | | H01B 7/0853 174/113 R |
| 2002/0136512 A1* | 9/2002 | Dallas | | G02B 6/443 385/110 |
| 2004/0022504 A1* | 2/2004 | Hurley | | G02B 6/4482 385/109 |
| 2004/0062496 A1* | 4/2004 | Shuman | | G02B 6/441 385/101 |
| 2005/0013565 A1* | 1/2005 | Mohler | | G02B 6/4422 385/113 |
| 2005/0213903 A1* | 9/2005 | Mohler | | G02B 6/4433 385/109 |
| 2006/0237221 A1* | 10/2006 | Glew | | H01B 11/06 174/146 |
| 2006/0269198 A1* | 11/2006 | Blazer | | G02B 6/4495 385/100 |
| 2007/0098343 A1* | 5/2007 | Miller | | G02B 6/4433 385/114 |
| 2007/0102188 A1* | 5/2007 | Glew | | H01B 7/295 174/113 C |
| 2007/0269171 A1* | 11/2007 | Keller | | G02B 6/4432 385/112 |
| 2008/0041622 A1* | 2/2008 | Seufert | | H01B 11/08 174/350 |
| 2008/0066947 A1* | 3/2008 | Glew | | G02B 6/4459 174/131 A |
| 2009/0169159 A1* | 7/2009 | Keller | | G02B 6/4432 385/110 |
| 2009/0214168 A1* | 8/2009 | Roscoe | | H01B 9/005 385/101 |
| 2010/0322563 A1* | 12/2010 | Melton | | G02B 6/3887 385/59 |
| 2011/0038586 A1* | 2/2011 | Keller | | G02B 6/441 385/113 |
| 2011/0229098 A1* | 9/2011 | Abernathy | | G02B 6/4402 385/102 |
| 2011/0243514 A1* | 10/2011 | Nav | | G02B 6/4459 385/110 |
| 2014/0369656 A1* | 12/2014 | Gimblet | | G02B 6/02395 385/113 |
| 2015/0086168 A1* | 3/2015 | Blazer | | G02B 6/4413 385/102 |
| 2015/0117825 A1* | 4/2015 | Burke | | H01B 11/22 385/101 |
| 2015/0310964 A1* | 10/2015 | Larson | | G02B 6/441 174/71 R |
| 2016/0018612 A1* | 1/2016 | Czosnowski | | G02B 6/4434 385/100 |
| 2016/0041354 A1* | 2/2016 | Guenter | | G02B 6/4432 385/86 |
| 2016/0133355 A1* | 5/2016 | Glew | | H01B 7/295 248/49 |

\* cited by examiner

OPTICAL TRUNK CABLE HAVING WEB-CONNECTED SUB-UNITIZED CONFIGURATION

PRIORITY CLAIM

This application claims the benefit of U.S. Provisional Application Ser. No. 62/118,229, titled "Optical Trunk Cable Having Web-Connected Sub-Unitized Configuration," filed Feb. 19, 2015, which is hereby relied upon and incorporated herein by reference for all purposes.

BACKGROUND OF THE INVENTION

The present invention relates generally to fiber optic cable. More particularly, the present invention relates to an improved optical trunk cable having a plurality of cable units that may be individually branched.

The ability of high-quality optical fiber to transmit large amounts of information without appreciable signal degradation is well known. As a result, optical fibers have found widespread use in many applications, such as voice and data transmission. For example, the need for greater bandwidth in residential settings has brought optical fibers directly into homes and multiple dwelling units (MDUs). Such applications have generally come to be known by the acronym FTTH ("Fiber To The Home").

In deployment of fiber optic cable for FTTH applications there is a need to access one or more fibers within a cable at various points over a given route. Each time the cable is accessed the integrity of the cable is compromised. The jacket is opened and buffer tubes accessed to remove and splice individual fibers. A sealing mechanism such as a closure must be used to cover this access point and protect the fiber and cable from the environment. Since accessing fiber from the cable exposes potentially all fibers depending on the cable design this method is fraught with risk as other fibers could be damaged.

The present invention recognizes the foregoing considerations, and others, of the prior art.

SUMMARY OF THE INVENTION

According to one aspect, the present invention provides an optical trunk cable comprising at least one elongated strength member and a plurality of elongated optical fiber units. Each of the optical fiber units may have an inner jacket containing a plurality of optical fibers. The optical fiber units further have an outer jacket, the optical fiber units and the elongated strength member being interconnected via a plurality of webs.

Other objects, features and aspects of the present invention are provided by various combinations and subcombinations of the disclosed elements, as well as methods of practicing same, which are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Figure 1:
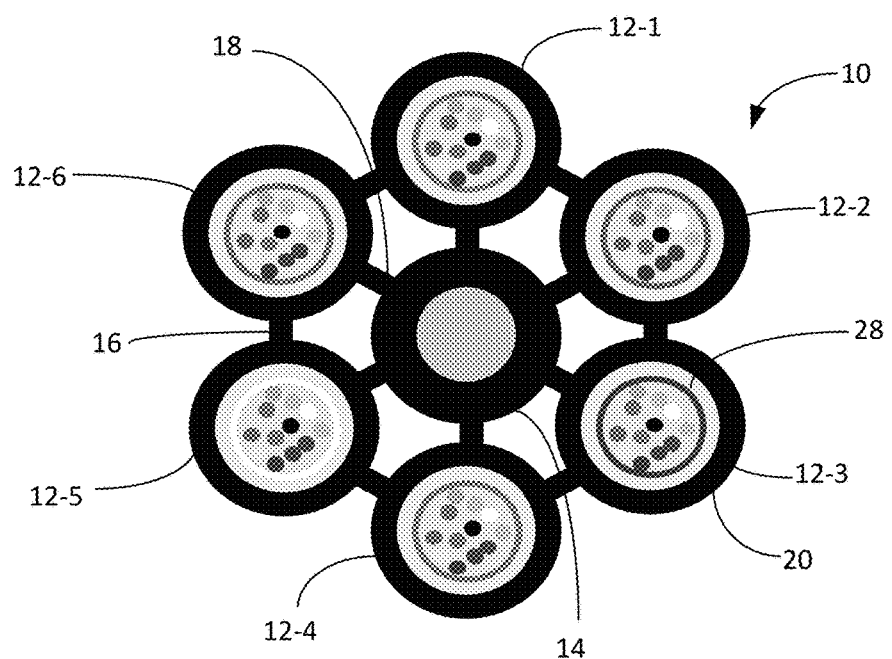
FIG. 1 is a diagrammatic end view of an optical trunk cable in accordance with an embodiment of the present invention.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

Referring now to FIG. 1, an optical trunk cable 10 constructed in accordance with the present invention is illustrated. Trunk cable 10 has a plurality of optical fiber units interconnected to form a bundle. In the illustrated embodiment, a total of six such optical fiber units (respectively indicated at 12-1 through 12-6) are provided. However, embodiments are contemplated having any suitable number of optical fiber units (e.g, 2-12 such units). The optical fiber units surround a central strength member (CSM) 14 which provides sufficient rigidity for the drop cable application. For example, CSM 14 may comprise a jacketed bundle of aramid fiber reinforced polymer (FRP) or, in some cases, steel wire.

In this embodiment, optical fiber units 12 are interconnected both to each other and to CSM 14 via respective webs, such as webs 16 and 18. Webs 16 and 18 may be formed of the same material that forms the outer jacket 20 of each optical fiber unit 12. For example, a reverse oscillating lay (ROL) apparatus may be used during the outer jacket and web extrusion process. Various aspects of a ROL apparatus and process may be discerned from U.S. Pat. No. 6,546,712, incorporated herein by reference for all purposes. The reverse oscillated lay desirably allows for omnidirectional bending of the cable. Preferably, however, the thickness of the webs may be slightly less than the outer jacket thickness to facilitate separation.

For example, in a preferred embodiment, each optical fiber unit may have a diameter of approximately 4 mm, with the overall cable diameter being about 12 mm. The unit outer jacket thickness may be about 0.5 mm in such embodiments, with a web thickness of less than about 0.3 mm. It will appreciated that this configuration limits exposure of cable components and allows access of only the desired optical fiber units (sub-units). By individually protecting each sub-unit as an individual cable and tying those units together, access is obtained while continuing to protect the rest of the fiber cable. The webs will allow a technician to easily select the desired unit to be accessed and with common tools remove it from the cable. This sub-unit can then be routed and terminated for drop cable termination.

As described above, trunk cables of the prior art have an outer sheath which must be cut in order to access the optical fiber units or individual optical fibers contained inside. This often presents difficulties during the branching process. In contrast, trunk cable 10 does not have an outer sheath in which all of the optical fiber units are contained. This facilitates branching of the optical fiber units as will be described below.

Figure 2:
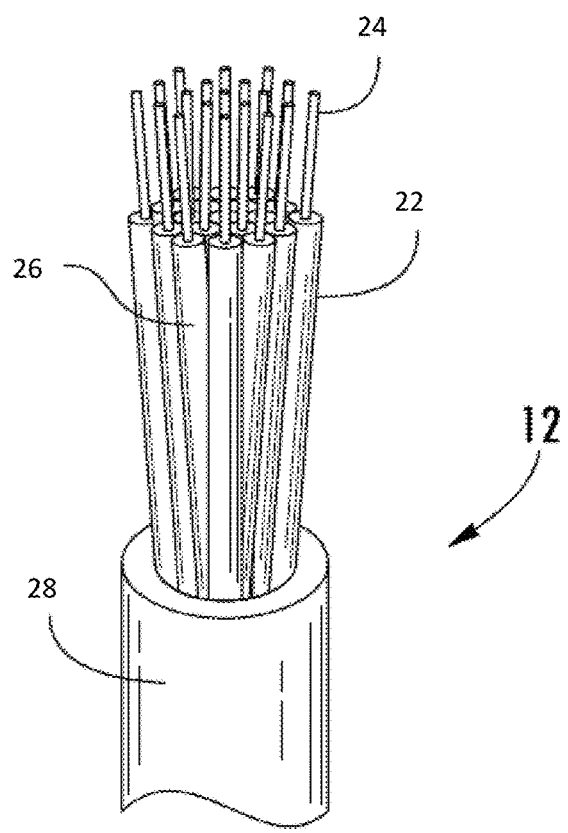
FIG. 2 is a perspective view of an optical fiber unit of the optical trunk cable of FIG. 1, separated from other optical fiber units in the cable and with layers cut away.

The respective optical fiber units 12 will typically contain a plurality of optical fibers for providing data communication to a corresponding customer. In this regard, FIG. 2 illustrates an optical fiber unit 12 which may be employed in trunk cable 10. As shown, optical fiber unit 12 includes multiple optical fibers 22 extending along its axis. Each of the optical fibers 22 comprises the combination of the optical conductor 24 for transmission of optical signals and its protective sheath 26. Typically, sheath 26 may be formed of a thermopolymer such as PVC, PE, PVDF, etc. The number of optical fibers 22 within each fiber unit 12 may vary, but typical fiber counts are 4, 6, 12, etc. In addition, each of the fiber units 12 may further include loose fiber glass or aramid filaments that provide strength to optical fiber unit 12. These strength elements may contain super absorbant polymers (SAP) which when exposed to water swell and block the passage of liquids. The optical fibers 22 (and strength filaments) of each fiber unit 12 may be encased by an inner jacket 28, which may be formed of a suitable material such as PE, PVDF, plenum-rated PVC, riser-rated PVC or LSZH.

Figure 3:
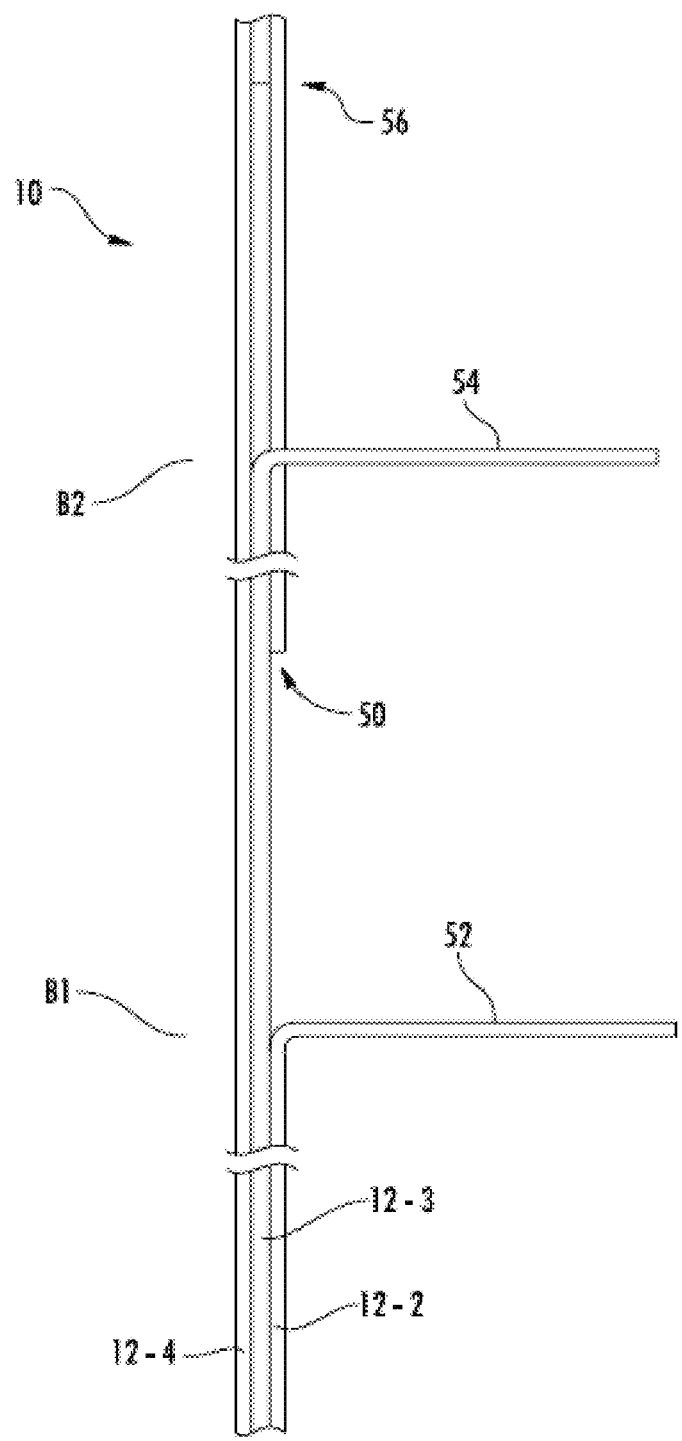
FIG. 3 diagrammatically illustrates branching of optical fiber units from an optical trunk cable in accordance with an embodiment of the present invention.

Referring to FIG. 3, a typical installation of trunk cable 10 is illustrated. In this case, trunk cable 10 is installed vertically in a building having multiple floors. Respective branching positions B1 and B2 correspond to two of the floors. It is desired to separate one optical fiber unit from the bundle at branching position B1 and a second optical fiber unit 12 from the bundle at branching position B2. In particular, optical fiber unit 12-2 is branched at B1 while optical fiber unit 12-3 is branched at B2.

In order to accomplish this, unit 12-2 is cut (as indicated at 50) at a position higher than B1. This provides a tail portion 52 which can be removed from the bundle for optical connection to existing horizontal cable in the building. It will be appreciated that tail portion will need to be separated from the rest of the bundle by cutting or otherwise separating the interconnecting webs. Similarly, a tail portion 54 can be formed by cutting at location 56 and separating from the rest of the bundle. Depending on the length of tail portions 54 and 56, they may each serve as horizontal cable as is, without the need to splice to other cable.

In an alternate interpretation of FIG. 3, a typical installation of distribution cable 10 is illustrated as would be used in FTTH. In this case, distribution cable 10 is installed horizontally (either hung aerially, within duct, or trenched underground). Respective branching positions B1 and B2 correspond to two access points such as demarcation enclosure, terminal for hardened fiber optic connectors, or pedestal. In the example given it is desired to terminate twelve optical fiber bundle at branching position B1 and a second twelve fiber optical fiber bundle at branching position B2.

It can thus be seen that the present invention provides an improved optical trunk cable having various advantages over the prior art. These advantages include:
1. Only one sub-unit accessed from cable at a time.
2. Each sub-unit is self-contained cable.
3. Any length of sub-unit can be removed from the main cable.
4. Exceptional bending flexibility.

While preferred embodiments of the invention have been shown and described, modifications and variations may be made thereto by those of ordinary skill in the art without departing from the spirit and scope of the present invention. Furthermore, it should be understood that aspects of the various embodiments may be interchanged both in whole or in part. Furthermore, those of ordinary skill in the art will appreciate that the foregoing description is by way of example only, and is not intended to be limitative of the invention as further described in the appended claims.

What is claimed is:

1. An optical trunk cable comprising:
   at least one elongated strength member;
   a plurality of elongated optical fiber units, each of said optical fiber units having an inner jacket containing a plurality of optical fibers; and
   said optical fiber units further having an outer jacket, said optical fiber units and said elongated strength member being interconnected via a plurality of webs, wherein at least one of the plurality of webs extends between and connects a pair of the optical fiber units.

2. An optical trunk cable as set forth in claim 1, wherein at least one of the plurality of webs extends between and connects one of said optical fiber units and said elongated strength member.

3. An optical trunk cable as set forth in claim 1, wherein said optical fiber units are arranged radially around said elongated strength member.

4. An optical trunk cable as set forth in claim 1, wherein said elongated strength member has an outer jacket, said outer jackets being formed of the same material as said webs.

5. An optical trunk cable as set forth in claim 4, wherein said outer jackets and said webs are unitary.

6. An optical trunk cable as set forth in claim 1, wherein a thickness of each of the plurality of webs is less than a thickness of the outer jacket of each of the plurality of optical fiber units.

7. An optical trunk cable comprising:
   at least one elongated strength member;
   a plurality of elongated optical fiber units, each of said optical fiber units containing a plurality of optical fibers; and
   said optical fiber units and said elongated strength member being interconnected via a plurality of webs, wherein at least one of the plurality of webs extends between and connects a pair of the optical fiber units.

8. An optical trunk cable as set forth in claim 7, wherein said optical fiber units are arranged radially around said elongated strength member.

9. An optical trunk cable as set forth in claim 7, wherein said elongated strength member has an outer jacket, said outer jackets being formed of the same material as said webs.

10. An optical trunk cable as set forth in claim 9, wherein said outer jackets and said webs are unitary.

11. An optical trunk cable as set forth in claim 7, wherein at least one of the plurality of webs extends between and connects one of said optical fiber units and said elongated strength member.

12. An optical trunk cable as set forth in claim 7, wherein a thickness of each of the plurality of webs is less than a thickness of the outer jacket of each of the plurality of optical fiber units.

13. An optical trunk cable comprising:
   at least one elongated strength member;
   a plurality of elongated optical fiber units, each of the optical fiber units containing a plurality of optical fibers and an outer jacket containing the plurality of optical fibers; and
   a plurality of webs interconnecting the optical fiber units and the elongated strength member, wherein a thickness of each of the plurality of webs is less than a thickness of the outer jacket of each of the plurality of optical fiber units.

14. An optical trunk cable as set forth in claim 13, wherein said optical fiber units are arranged radially around said elongated strength member.

15. An optical trunk cable as set forth in claim 13, Wherein said elongated strength member has an outer jacket, said outer jackets being formed of the same material as said webs.

16. An optical trunk cable as set forth in claim 15, wherein said outer jackets and said webs are unitary.

\* \* \* \* \*